United States Patent
Leung et al.

(10) Patent No.: US 10,721,211 B2
(45) Date of Patent: *Jul. 21, 2020

(54) HIERARCHICAL CLUSTERING IN A GEOGRAPHICALLY DISPERSED NETWORK ENVIRONMENT

(71) Applicant: Cisco Technology, Inc., San Jose, CA (US)

(72) Inventors: Kent K. Leung, Palo Alto, CA (US); Xun Wang, San Jose, CA (US); Andrew E. Ossipov, Richardson, TX (US); Zhijun Liu, Cupertino, CA (US); Jonathan Augustine Kunder, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 15/783,706

(22) Filed: Oct. 13, 2017

(65) Prior Publication Data

US 2018/0041474 A1 Feb. 8, 2018

Related U.S. Application Data

(63) Continuation of application No. 14/619,759, filed on Feb. 11, 2015, now Pat. No. 9,800,549.

(51) Int. Cl.
*H04L 29/06* (2006.01)
*H04L 29/12* (2006.01)

(52) U.S. Cl.
CPC ...... *H04L 63/0254* (2013.01); *H04L 63/0218* (2013.01); *H04L 61/2007* (2013.01); *H04L 61/2061* (2013.01)

(58) Field of Classification Search
CPC ............ H04L 63/0254; H04L 63/0218; H04L 61/2007; H04L 61/2061
(Continued)

(56) References Cited

U.S. PATENT DOCUMENTS 6,298,061 B1 * 10/2001 Chin ................... H04L 12/4604
370/216
6,779,039 B1 8/2004 Bommareddy
(Continued)

OTHER PUBLICATIONS

"ASA Clustering within VMDC Architecture," Published on or about Mar. 22, 2014, pp. 1-22 http://www.cisco.com/c/en/us/td/docs/solutions/Enterprise/Data_Center/VMDC/ASA_Cluster/ASA_Cluster/ASA_Cluster.pdf.

*Primary Examiner* — Tauqir Hussain
(74) *Attorney, Agent, or Firm* — Polsinelli PC

(57) ABSTRACT

An example method for facilitating hierarchical clustering in a geographically dispersed network environment is provided and includes receiving a packet at one of a plurality of adaptive security appliance (ASA) units in one of a plurality of ASA clusters in a cluster domain of a network environment, identifying the packet as matching an inter-data center live traffic profile, identifying a target ASA cluster in the plurality of ASA clusters in the cluster domain, querying a domain director in the target ASA cluster for a flow owner, and if the flow owner is identified by the domain director, forwarding the packet to the flow owner in the target cluster, and if the flow owner is not identified by the domain director, and the domain director includes a flow state for a flow to which the packet belongs, designating the ASA unit as the flow owner.

20 Claims, 9 Drawing Sheets

(58) Field of Classification Search
USPC .......................................................... 709/238
See application file for complete search history.

(56) References Cited

U.S. PATENT DOCUMENTS

| | | | |
|---|---|---|---|
| 7,197,660 | B1 | 3/2007 | Liu et al. |
| 7,233,981 | B2* | 6/2007 | Tenereillo ............... H04L 29/06 |
| | | | 709/219 |
| 7,467,225 | B2* | 12/2008 | Anerousis ............... H04L 29/06 |
| | | | 709/238 |
| 8,243,734 | B1 | 8/2012 | Deters |
| 8,316,113 | B2* | 11/2012 | Linden .................. G06F 11/181 |
| | | | 709/220 |
| 2004/0088424 | A1 | 5/2004 | Park |
| 2007/0283023 | A1 | 12/2007 | Ly |
| 2009/0040926 | A1* | 2/2009 | Li ...................... H04L 41/0893 |
| | | | 370/230.1 |
| 2010/0271973 | A1 | 10/2010 | Lee |
| 2012/0047107 | A1* | 2/2012 | Doddavula ....... G06F 17/30575 |
| | | | 707/620 |
| 2013/0155902 | A1* | 6/2013 | Feng .................... H04L 67/1031 |
| | | | 370/255 |
| 2013/0191829 | A1 | 7/2013 | Shimokawa |
| 2013/0301522 | A1 | 11/2013 | Krishna |
| 2013/0304909 | A1 | 11/2013 | Pappu |
| 2013/0311640 | A1 | 11/2013 | Gleixner |
| 2014/0025736 | A1* | 1/2014 | Wang ..................... H04L 45/46 |
| | | | 709/204 |
| 2014/0282830 | A1 | 9/2014 | Davis |
| 2015/0019756 | A1 | 1/2015 | Masuda |
| 2015/0036538 | A1 | 2/2015 | Masuda |
| 2015/0173011 | A1* | 6/2015 | Das ........................ H04W 16/26 |
| | | | 370/328 |
| 2015/0222526 | A1 | 8/2015 | Baykal |

* cited by examiner

| | | EXISTING FLOW IN MULTI-DC CLUSTER DOMAIN | |
|---|---|---|---|
| | NEW FLOW IN MULT-DC CLUSTER DOMAIN | NEW FLOW IN LOCAL DC (CLUSTER) | EXISTING FLOW IN LOCAL DC (CLUSTER) |
| OWNER IS KNOWN<br><br>NOTE: MOST COMMON CASE FOR NEW FLOWS SINCE MAJORITY ARE TCP | TCP SYN | BECOME OWNER 192 | N/A | N/A |
| | TCP SYN/ACK | OWNER INFO IN SYN COOKIE (WITH CLUSTER ID AND UNIT ID) 194 | N/A | N/A |
| OWNER LOOKUP | TCP SYN/ACK WITHOUT COOKIE, UDP PACKET, OR TCP PAYLOAD | LOOK UP OWNER (IN CLUSTER) => NONE;<br>LOOK UP OWNER (IN DOMAIN) => NONE<br><br>NOTE: ONE EXTRA MESSAGE FOR DOMAIN LOOKUP AT THE ARRIVAL OF THIS TYPE OF PACKET IN THE FLOW.<br><br>ISSUE: EXTRA DOMAIN LOOKUP CAUSES EXTRA LATENCY AND PROCESSING. LIMIT THE CLUSTER DOMAIN LOOKUP TO INTER-DC LIVE TRAFFIC PROFILE (e.g. NO HTTP) REDUCES THE OVERHEAD.<br><br>196 | LOOK UP OWNER (IN CLUSTER) => NONE;<br>LOOK UP OWNER (IN DOMAIN) => FOUND<br><br>NOTE: LESS COMMON CASE FOR EXISTING FLOWS. IT MAY HAPPEN FOR LIVE VM MIGRATION AND ASA CLUSTER OUTAGE.<br><br>198 | LOOK UP OWNER (IN CLUSTER) => FOUND<br><br>NOTE: MOST COMMON CASE FOR EXISTING FLOWS, SO AVOID DOMAIN LOOKUP BY PERFORMING CLUSTER LOOKUP BEFOREHAND. THIS ALLOWS THE CLUSTER TO OPERATE INDEPENDENTLY AND EFFICIENTLY.<br><br>200 |

FIG. 9

HIERARCHICAL CLUSTERING IN A GEOGRAPHICALLY DISPERSED NETWORK ENVIRONMENT

RELATED APPLICATIONS

This application is a continuation of U.S. patent application Ser. No. 14/619,759 filed on Feb. 11, 2015, the contents of which is incorporated by reference in its entirety.

TECHNICAL FIELD

This disclosure relates in general to the field of communications and, more particularly, to hierarchical clustering in a geographically dispersed network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 9 is a simplified block diagram illustrating example details of an embodiment of the communication system.

DETAILED DESCRIPTION OF EXAMPLE EMBODIMENTS

Overview

An example method for facilitating hierarchical clustering in a geographically dispersed network environment is provided and includes receiving a packet at one of a plurality of adaptive security appliance (ASA) units in one of a plurality of ASA clusters in a cluster domain of a network environment, identifying the packet as matching an inter-data center live traffic profile, identifying a target ASA cluster in the plurality of ASA clusters in the cluster domain, querying a domain director in the target ASA cluster for a flow owner, and if the flow owner is identified by the domain director, forwarding the packet to the flow owner in the target cluster, and if the flow owner is not identified by the domain director, and the domain director includes a flow state for a flow to which the packet belongs, designating the ASA unit as the flow owner.

As used herein, the term "flow owner" of a flow (e.g., sequence of packets in both directions of a connection over one or more communication links; each flow may be identified by a unique tuple (e.g., 5-tuple consisting of protocol name, source/destination endpoint addresses and source/destination transport ports)) refers to a primary ASA unit (e.g., principal ASA unit, first ASA unit that received the first packet of a flow, etc.) that provides security and other appropriate services (other than mere forwarding) to packets of the flow. The "domain director" refers to another ASA unit that at least maintains flow states and backups for the flow in the cluster domain. As used herein, "target ASA cluster" refers to the ASA cluster to which the flow owner belongs. Note that each ASA cluster acts as one logical ASA device to traffic flowing through the ASA cluster; likewise, the cluster domain acts as one logical ASA device to relevant inter-data center (DC) live traffic among the ASA clusters.

Example Embodiments

Figure 1:
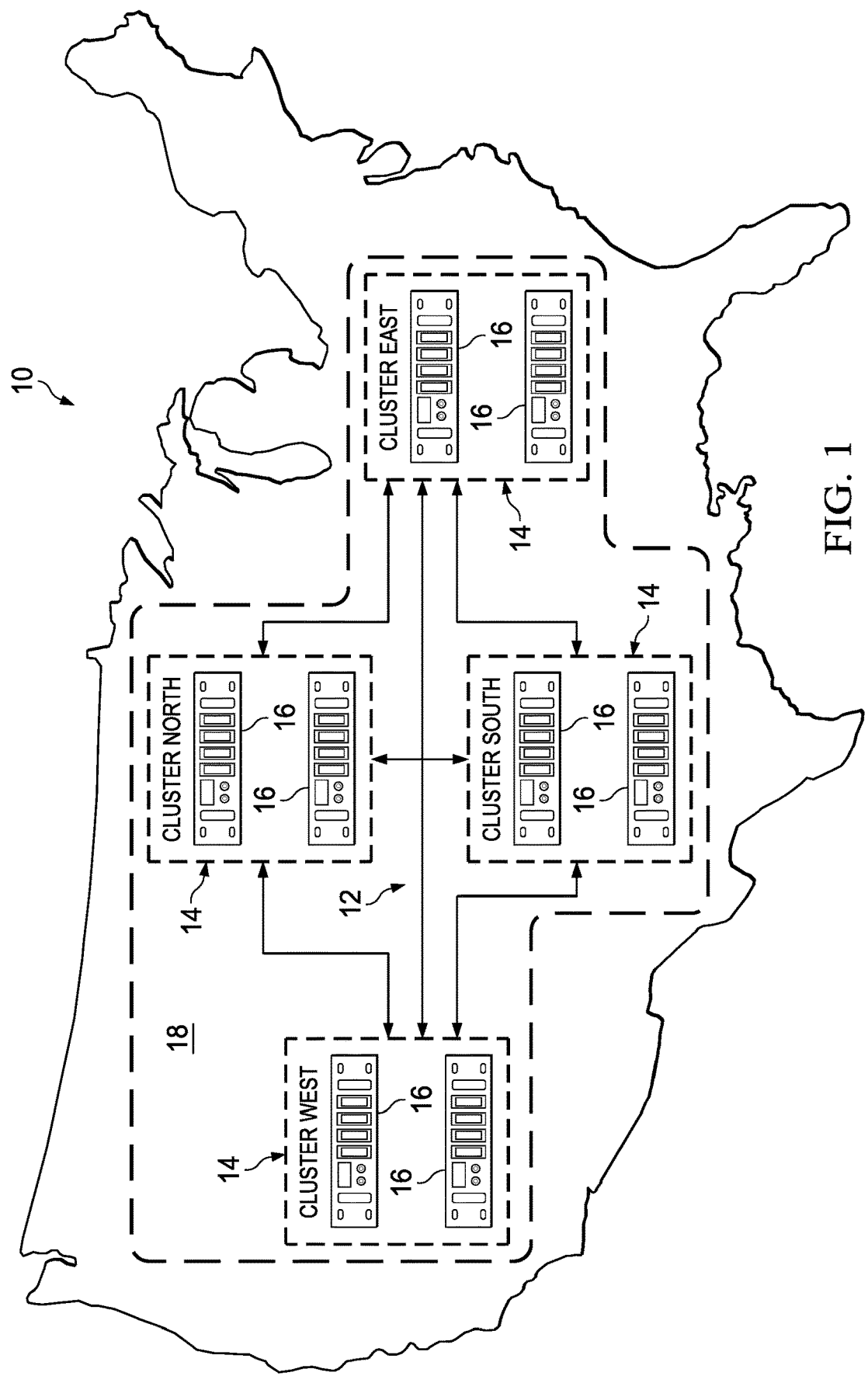
FIG. 1 is a simplified block diagram illustrating a communication system for facilitating hierarchical clustering in a geographically dispersed network environment.

Turning to FIG. 1, FIG. 1 is a simplified block diagram illustrating a communication system 10 for facilitating hierarchical clustering in a geographically dispersed network environment in accordance with one example embodiment. An example embodiment of communication system 10 includes a network 12 comprising a plurality of adaptive security appliance (ASA) clusters 14 dispersed in different geographical locations. Each ASA cluster 14 includes a plurality of ASA units 16. Each ASA cluster 14 acts as one logical ASA device. Note that the geographical dispersion is shown over the United States (US) merely for example purposes and not as a limitation; embodiments of communication system 10 can be applied to any geographical region across the globe.

In various embodiments, each ASA unit 16 comprises a network security device, which provides network security services such as firewalling, intrusion prevention, VPN, content security, unified communications, remote access, anti-virus, anti-spam, anti-phishing, universal resource locator (URL) blocking and filtering, and content control (among other security features). The network security device may be a standalone hardware device or may be located as a software (e.g., virtual) or hardware module in a network device operating as a firewall, VPN (Virtual Private Network) appliance, or gateway, for example inside a hardware device, such as a switch or a rack (or blade) server. The network security device may be located, for example, at a branch office or main office for communication with a plurality of endpoints. Although the particular embodiments described herein shows the use of ASAs, it should be understood that, in other embodiments, any network security device may be used. In still other embodiments, the network devices may not necessarily be network security devices but may instead be any network element for which hierarchical clustering across geographical locations may be desired.

According to various embodiments, ASA clusters 14 may be logically grouped into a single cluster domain 18 for flows comprising inter-data center (DC) live traffic. A portion of configuration settings of substantially all ASA units 16 in same cluster domain 18 are the same, irrespective of respective ASA clusters 14 to which they belong; another portion of configuration settings of ASA units 16 in any one ASA cluster 14 is different from corresponding configuration settings of ASA units 16 in other ASA clusters 14. In other words, substantially all ASA units 16 in one ASA cluster 14 have certain common configuration settings that serve to identify them as belonging to the specific ASA cluster; certain other configuration settings of substantially all ASA units 16 in substantially all ASA clusters 14 are the same in cluster domain 18, identifying such ASA units 16 as belonging to the same cluster domain. In one example embodiment, the portion of common configuration settings of substantially all ASA units 16 in cluster domain 18 relates to inter-DC live traffic.

Note that each ASA cluster 14 can be considered to belong to a separate portion of a DC, or a separate DC, as the case may be. For example, a Google™ DC may include Cluster North, Cluster South, Cluster West and Cluster East. Moreover, each DC located at a single geographical point (or region) may comprise more than one ASA cluster 14. For example, a DC in San Jose can include one ASA cluster 14 on Guadalupe Freeway, another ASA cluster 14 on Santa Clara Street, and several other ASA clusters 14 on Monterey Highway. In yet another example, a DC located in a single building can have multiple ASA clusters 14 located at different levels (e.g., ASA cluster A located in the first floor, ASA cluster B located in the second floor, etc.). In another example, one ASA cluster 14 can include several ASA units 16 dispersed geographically. For example, a Cisco DC may include ASA cluster 14 for traffic destined to a specific application, with the participant ASA units 16 located in different buildings in San Jose. Virtually any number and configuration of ASA clusters 14 may be included within the broad scope of the embodiments.

Inter-DC live traffic comprises traffic of flows that are classified to be able to cross the ASA cluster boundary (or the DC boundary) during an active network session (e.g., with open network connection between two network elements). Traffic in a typical DC generally flows in three directions: "North-South" traffic is limited to traffic that enters and exits the DC boundary; "East-West" traffic flows between DC devices and applications and never leaves the DC; "Inter-DC" traffic flows between multiple DCs, and between DCs and the private/public cloud. The inter-DC traffic is largely comprised of resource optimization and disaster recovery data between dispersed DCs and between DCs and the private/public cloud. In a general sense, backup traffic, virtual machine (VM) migration, service-oriented architecture (SOA) and/or replication among storage arrays generate inter-DC traffic between data centers. Another example of inter-DC traffic is video traffic, such as video replication and transit server-to-customer video serving across DCs. Yet another example of inter-DC live traffic is traffic to and from a live VM that is migrated from one DC to another. Note that as used herein, inter-DC traffic is meant to refer to traffic between ASA clusters 14 or from one ASA cluster 14 to another ASA cluster 14, which may or may not belong to distinct DCs. For example, traffic that migrates between DCs and from one ASA cluster 14 to another ASA cluster 14 may be included in inter-DC traffic. To clarify further, a connection established by an endpoint through ASA cluster A may traverse another ASA cluster B upon migrating the endpoint to a different DC.

As used herein, "live traffic" during a time interval refers to network traffic (e.g., data packets) being communicated over an open connection during the time interval between a source (e.g., computer) and a destination (e.g., another computer) in the network. As used herein, the term 'network element' is meant to encompass hardware components such as computers, network appliances such as ASAs, servers, routers, switches, gateways, bridges, load-balancers, firewalls, processors, modules, or any other suitable device, component, element, or object operable to exchange information in a network environment. Moreover, the network elements includes any suitably configured hardware provisioned with suitable software, components, modules, interfaces, or objects that facilitate the operations thereof. This may be inclusive of appropriate algorithms and communication protocols that allow for the effective exchange of data or information. For example, live traffic at an interface comprises packets crossing the interface in real time.

In a general sense, data center security entails scalable high performance that can be addressed by clustering firewalls, Next Generation Firewalls (NGFW), Next Generation Intrusion Prevention Systems (NGIPS), etc. Each ASA cluster 14 can scale to demands of a local area network (LAN) based DC in a fully distributed processing fashion, unlike other technologies with a centralized load-balancer that provides high availability but poor scalability. With geographically dispersed ASA clusters 14, the LAN can be stretched across DCs, with inter-DC clustering. Embodiments of communication system 10 take into consideration the traffic characteristics and operational requirements of geographically dispersed DCs that are different from traffic characteristics and operational requirements of a single ASA cluster.

Clustering is different from traditional active-active models. For example, in the active-active model of a Cisco® network, a multi-context firewall configuration is assumed, wherein two firewalls are connected together by a control link. (A single physical security device is partitioned into multiple virtual devices, known as security contexts; each context is an independent device, with its own security policy, interfaces, and administrators). Some of the security contexts are active on the first firewall and standby on the second firewalls, while the rest of the contexts are active on the second firewall and standby on the first. In contrast, every ASA unit 16 member of each ASA cluster 14 is capable of forwarding every traffic flow and can be active for all flows.

Turning to the operation of a single ASA cluster 14, all ASA units 16 in each ASA cluster 14 have the same configuration and actively pass traffic. A single configuration is maintained across all ASA units 16 in respective ASA clusters 14 using automatic configuration synchronization (sync). For example, a master is maintained for each ASA cluster 14, with other ASA units 16 in the cluster being slaves. Typically, the master ASA unit 16 is elected based on priority (or other suitable parameters). Any configuration updates to master ASA unit 16 triggers a configuration update from the master ASA unit 16 to the slave ASA units 16.

In another example, master ASA unit 16 pre-distributes addresses from a network address translation (NAT) pool across its own ASA cluster 14. In yet another example, each ASA cluster 14 has dedicated management interfaces. A pool of Internet Protocol (IP) addresses is created on master ASA unit 16, which assigns IPs to the management interfaces of slave ASA units 16. The IP assigned by the administrator to master ASA unit 16's management interface becomes the virtual IP address (VIP) for ASA cluster 14. All other IPs from the pool become the physical IPs on the ASA units 16.

In the event of a unit failure (e.g., of any one ASA unit 16), connectivity is maintained through corresponding ASA cluster 14 because connection information is replicated to at least one other ASA unit 16 in the cluster. Each connection has a replicated connection residing on a different ASA unit in each ASA cluster 14 that takes over in case of a failure. Typically, each ASA cluster 14 does not actively load balance flows; rather, external mechanisms (e.g., Ether-Channel Load-Balancer (ECLB) provided by external switches; Equal Cost Multi-path Routing/Policy-Based Routing (ECMP/PBR) performed by routers; etc.) ensure that packets and traffic flows hitting each ASA unit 16 of each ASA cluster 14 are properly load-balanced. Within each ASA cluster 14, proprietary clustering control protocol realigns asymmetrical flows and offloads some flows to others units if one ASA unit 16 in the cluster is over utilized.

To support stateful operation of ASA data path within each ASA cluster 14, state for each connection on any one ASA unit 16 called the "flow owner" is centralized: all packets belonging to the same connection are processed at the flow owner, and if packets arrive at a non-flow owner unit within the same ASA cluster 14, they are forwarded to the flow owner over a cluster control link (CCL) for processing. Generally, the first ASA unit 16 to receive a packet of a new flow for a connection is designated as the flow owner. To provide fault-tolerance, the flow states are backed-up (e.g., replicated) on a different ASA unit 16, called the "director". In addition, the director also provides flow owner information of the flow to all other ASA units 16 in the cluster. The director unit is selected by performing a hash over the connection's 5-tuple (e.g., source address, destination address, port number, etc.). Any ASA unit 16 in the ASA cluster would find the same director using the 5-tuple, and would get the flow owner by querying the director.

If one ASA unit 16 in ASA cluster 14 receives a packet for a flow that it does not own, it contacts the director (in the same cluster) of that flow to learn which ASA unit 16 owns the flow. After the ASA unit 16 learns the flow owner, it creates and maintains a forwarder flow, which is used to forward any packets it receives on that connection directly to the flow owner, bypassing the director. Based on the flow's characteristics, all ASA units 16 in the cluster can derive the director for the flow. The director typically maintains a stub (e.g., backup) flow, which can become the full flow in case the flow's owner fails, and can also be used to redirect other ASA units 16 towards the flow owner if they receive packets for the flow.

However, ASA clustering with merely one cluster can have certain disadvantages. For example, current ASA clustering technology only allows a maximum of 16 ASAs in a cluster, with no provision for data center redundancy. If one cluster spans multiple DCs, such a maximum limit may restrict deployment. For example, customers that deploy one pair of fully populated security services chassis with six blades in a DC would only be able to span the cluster to two DCs. It would not be possible to add a third DC because the addition would require 18 units in the cluster. According to various embodiments, it may be better to maintain the cluster size in a DC and independently scale the number of DCs in a logical group.

ASA clustering with merely one cluster may not provide sufficient data center redundancy. DC failure (e.g. connectivity to site is lost or cluster failure in the site) results in flow loss when both flow owner and director/backup states are in the same DC (e.g., selection of the director/backup does not consider DC boundary). Customers that require high availability (HA) for DC-type of failure could not deploy such a single DC type of cluster. According to various embodiments, it may be better to maintain an inter-DC backup with more than one cluster.

With a single ASA cluster, there is only one policy in place for the cluster. DCs that are joined as a group in a cluster domain may have DC-specific policy in addition to a global policy. However, in single ASA cluster mechanisms, decoupling the DC-specific and DC-independent policies may not be possible because a single configuration is replicated in all ASAs in the cluster. According to various embodiments, it may be better for each DC to have its own configuration that includes both DC-specific and DC-independent policy, with DC specific policy synchronized only among ASAs specific to the DC.

Control of inter-DC traffic is not taken into consideration with a single ASA cluster. Moreover, disconnected DCs could lose connections, whereas reconnecting operating DCs could break existing connections. Not all flows (e.g. short lived flows, applications with auto-recovery) may require inter-DC high availability (HA). The services in the DC that require inter-DC HA may be different than the ones that require intra-DC HA. According to various embodiments, it may be better to identify impacted flows based on zone, context, or subnet to reduce unnecessary overhead (e.g., maintaining all flows in all the DCs increases memory, messaging, processing, and decreases overall capacity). Another reason to maintain separate DC-specific clusters could be that the amount of inter-DC traffic may be relatively small as compared to East-West and North-South volume locally processed by each DC. It can be generally advantageous to keep traffic local to the DC, for example, because inter-DC bandwidth may be expensive in terms of fiscal costs (service provider fees) and application latency. As such, stretching a single cluster across multiple data centers may not be practical in some scenarios.

Further, if the control link between DCs disconnects, flows for centralized features (e.g., features that can be applied by a central cluster master; for example, packets matched to processing by such features are redirected to the cluster master by the slaves in the cluster) could be lost in the DC that does not have the master ASA of the cluster, potentially impacting operations in the DC. With geographical dispersion between DCs in various locations, there could be a higher chance of the control link failing between DCs rather than intra-DC. According to various embodiments, it may be better that disconnected DCs can operate independently (e.g., with centralized feature for each DC). Moreover, if the control link between DCs disconnects, "split brain" scenario with one master in each DC could potentially occur. When the control link is reconnected, one specific master takes over and all flows could be lost in the DC that does not have that specific master, because each ASA flushes its flows to join the cluster. According to various embodiments, it may be better that connecting or reconnecting DCs does not affect intra-DC flows.

There could be delay in flow owner lookup, with no guaranteed off-site flow backup. For every unknown packet (e.g., UDP, TCP SYN/ACK without cookie, TCP payload), the flow owner lookup messaging may travel between clusters. The inter-cluster round trip time (RTT) latency may be higher than intra-DC due to geographical distances. Applications such as VoIP media stream may be sensitive to such delay. According to various embodiments, it may be better that flow owner lookup is localized (e.g., as most traffic stay within a DC).

Traffic latency can be high with inter-DC link bandwidth consumption for centralized features, with broadcast chattiness across DCs and no selective control of inter-DC operation and flow localization (e.g., "tromboning:" situation where a network endpoint migrates from one DC to another, but the associated existing connections are still redirected to the original DC for security processing). For centralized features, flows are anchored at the master in a single ASA cluster scenario, whereas flows belonging to a DC that does not have the master can require traffic redirection twice, potentially adding latency and also consuming inter-DC network bandwidth. According to various embodiments, it may be better to have centralized feature support in each DC.

Moreover, with a single cluster spanning multiple geographical locations, master election and health monitoring over the inter-DC link could be chatty. According to various embodiments, it may be better to localize such functions within the DC and only notify other DCs when change event occurs in the cluster within one of the DCs. The cost, latency, bandwidth for the control link between DCs is different from an intra-DC scenario. It may be better to be able to control inter-DC operation (e.g., flow sync interval, bulk sync, etc.) differently than intra-DC operation.

Embodiments of communication system 10 can resolve such issues with an additional level of clustering to support a group of DCs. Corresponding logic is integrated to enhance ASA clustering for intra-DC and inter-DC traffic. The result is hierarchical clustering optimized for normal operation of a DC and inter-DC traffic support. In one example embodiment, the hierarchical clustering includes: Inter-DC Cluster Control Link (CCL) to connect the DCs; cluster master in each ASA cluster 14 to communicate with each other for health monitoring and cluster information dissemination; two tier flow mapping for inter-DC and intra-DC lookups; and flow redundancy built-in to each level of clustering.

Embodiments of communication system 10 can maintain active-active mode of operation for clustering within a DC and also across multiple DCs. Scaling performance of ASA clustering within a DC can be maintained. The capability to support clustering among multiple DCs can be enhanced, as also redundancy support across DCs. Embodiments of communication system 10 can ensure autonomy for each DC and yet provide a common policy and service enforcement in a cluster of DCs, providing improved support for VM mobility, optimizing operation of various clustering functions and minimizing inter-DC bandwidth consumption.

Embodiments of communication system 10 can support security services such as FW, NGFW, NGIPS, etc. that span across multiple DCs. Some embodiments of communication system 10 use hierarchical clustering optimized for normal operation in the DC. Each level of clustering is scaled independently. Flow redundancy can scale in a distributed manner across DCs. Embodiments of communication system 10 support DC-specific and DC-independent policies for traffic in one DC or across DCs. Inter-DC link failure can be handled gracefully, for example, by sheltering operation within a DC from external disruption. Moreover, in various embodiments, flow ownership and processing follows endpoint location (e.g., stateful session mobility).

In an example embodiment, multiple sets of stateful ASA units 16 are configured independently as local ASA clusters 14. In a specific example, each ASA cluster 14 can service a particular DC site. Cluster domain 18 is created (e.g., generated, formed, etc.) when a data subnet is extended between multiple DCs so that multiple local ASA clusters 14 service traffic for the given set of protected endpoints. In the specific example illustrated in the figure, traffic between certain clients (not shown) and certain servers (not shown), for example, related to a specific application are serviced by one or more of ASA clusters 14 with common configuration to generate cluster domain 18.

In some embodiments, an administrator places the logical interfaces of each cluster domain member ASA cluster 14 that connects to the extended subnet in a particular inter-site traffic zone, potentially allowing multiple ASA clusters 14 in cluster domain 18 to exchange flow information and pick up stateful traffic forwarding tasks on workload migrations and failures. Each local ASA cluster 14 backs up the stateful connection information for the extended interfaces to a different domain member (e.g., another ASA cluster 14), potentially ensuring uninterrupted traffic forwarding when all local members fail.

In some embodiments, a Cluster Control Link (CCL) is extended to inter-cluster communication. For example, the cluster master exchanges cluster domain membership information and cluster membership list with other cluster masters over the CCL. CCL may be used for health monitoring of ASA clusters 14 in cluster domain 18. Flow owner lookup via domain director/backup may also be performed over the CCL. Other examples include flow state sync via domain director/backup, and traffic redirection for inter-DC traffic. For inter-cluster CCL, metadata in the redirected packet maps an ingress interface (e.g., different between clusters) to a policy that is common across clusters (e.g. ingress zone that is common in cluster domain 18). In some embodiments, the inter-cluster CCL uses jumbo frames to avoid fragmentation. In some embodiments, the inter-cluster CCL is restricted to traffic for the purpose of inter-cluster messaging and flow redirection; normal "user traffic" does not use inter-cluster CCL. Broadcast packets are filtered from inter-cluster CCL communication (e.g., overlay transport virtualization (OTV) filter).

In various embodiments, an external management system provides site-independent and site-specific configuration to cluster masters in each ASA cluster 14, the master ASA unit 16 distributing the configuration to all the slaves in the corresponding cluster. In some embodiments, some configuration update on any one cluster master may be synced with other cluster masters in cluster domain 18. In an example embodiment, substantially all clusters in cluster domain 18 operate in active mode and distributed manner (e.g., ASA units 16 communicate directly with each other for flow lookup, flow state sync, and traffic redirection across ASA clusters 14) without any centralized intermediary. Flows that cross the DC boundary (e.g., cluster boundary) are maintained when they match inter-DC live traffic profile. High availability for cluster domain 18 provides N:1 inter-cluster redundancy in a distributed manner (e.g., flow states in any one cluster are spread across some of the other clusters, for example, based on which clusters belong to the same extended DC subnet and therefore to the same inter-DC traffic zone). L2 unicast connectivity between clusters in the domain may be provided, with OTV filter of L2 broadcast staying within any one cluster. In some embodiments, traffic may be matched to the maximum forwarding capacity of inter-cluster traffic profile for inter-cluster CCL bandwidth.

In various embodiments, such hierarchical clustering for geographically dispersed DCs can provide an optimal, scalable, and distributed solution for security services that span across multiple DCs. The advantages of such hierarchical clustering include: leveraging benefits of existing ASA clustering technologies to elastically scale stateful services in a fully distributed fashion; supporting a cluster of clusters in the DCs with multi-level scalability and independent policy configuration, while mostly maintaining performance and capacity within any single DC having a corresponding ASA cluster 14; reliability of services can be enhanced beyond the DC boundary; physical and virtual form factors of stateful security services can be supported; inter-site traffic forwarding can be minimized, while providing native support for stateful session mobility for live workload migrations.

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Figure 2:
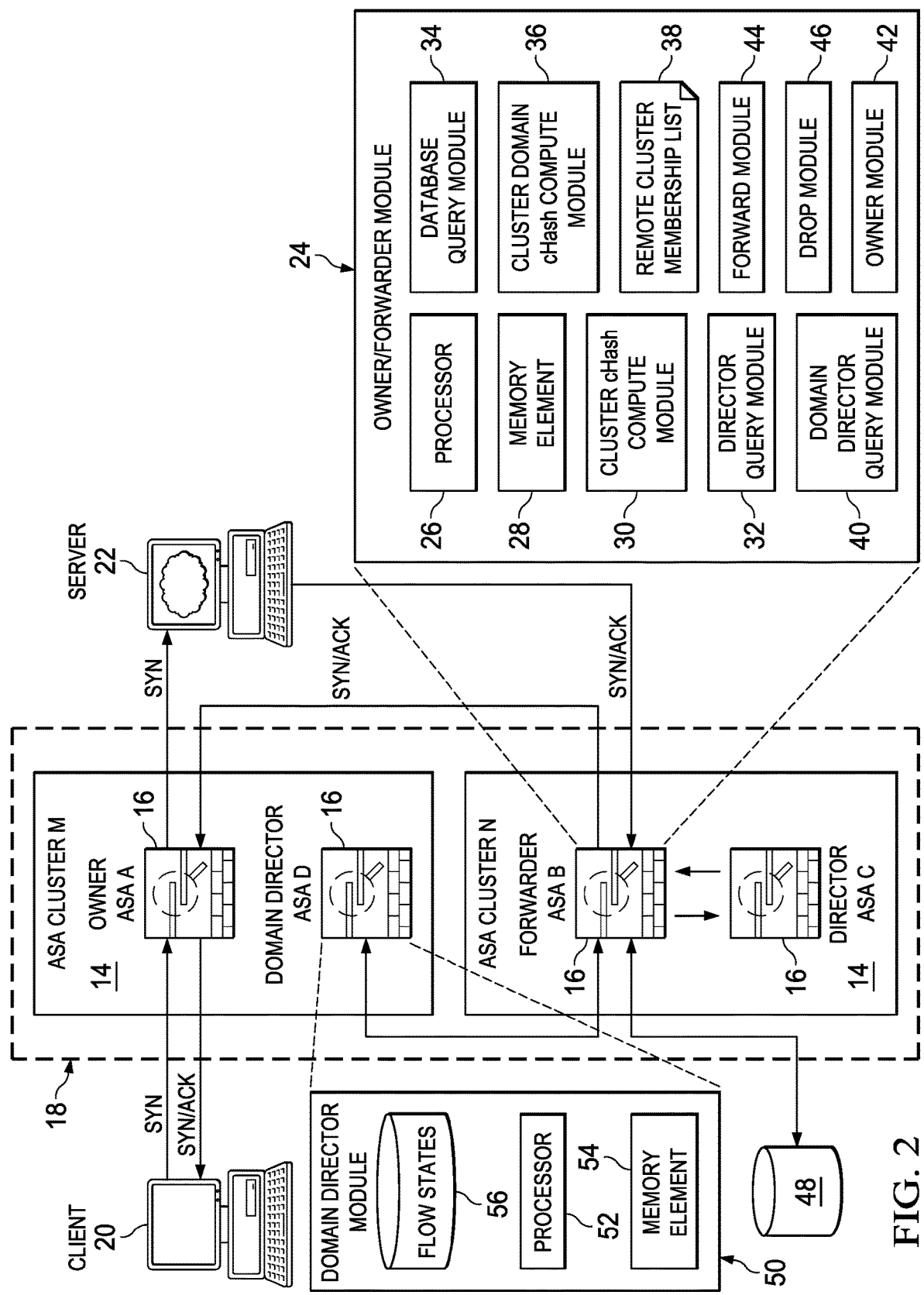
FIG. 2 is a simplified block diagram illustrating example details of embodiments of the communication system.

Turning to FIG. 2, FIG. 2 is a simplified block diagram illustrating details of an example data flow according to an embodiment of communication system 10. Assume that a client 20 sends a TCP SYN packet to a server 22. The SYN packet originates at client 20 and is delivered to one of ASA units 16, say, ASA A of one of ASA clusters 14, say ASA cluster M, in cluster domain 18. Because the SYN packet is a first packet of a flow, ASA A in ASA cluster M 14 becomes the flow owner. The flow owner creates flow tables and modifies the SYN packet by encoding owner and cluster information in the SYN packet. For example, a cluster identifier (ID) and unit ID may be inserted into the SYN packet. The flow owner forwards the modified SYN packet to server 22. Server 22 generates a SYN/ACK packet, which may be delivered to another ASA unit 16, say ASA B, which is not the flow owner. Assume, merely for example purposes, that ASA B is located in another ASA cluster 14, say ASA cluster N, that is different from the flow owner's ASA cluster M. In one example embodiment, ASA cluster M and ASA cluster N have a different cluster IDs. Note that in some embodiments, the network segment with server 22 is extended between the data centers and connected to clusters M and N on an interface in a particular common zone for inter-DC traffic.

ASA B includes an owner/forwarder module 24. Owner/forwarder module 24 includes a processor 26, a memory element 28, a cluster cHash compute module 30, a directory query module 32, a database query module 34, a cluster domain cHash module 36, a remote cluster membership list 38, a domain directory query module 40, an owner module 42, a forward module 44 and a drop module 46. Owner module 42 may include flow tables for flows for which ASA B is the flow owner; forward module 44 may include forwarding information for flows for which ASA B is not the flow owner, but merely a forwarder. Drop module 46 may maintain rules indicating that certain packets matching the rules be dropped.

In various embodiments, ASA B looks up owner module 42, and determines that it is not the flow owner to which the received SYN/ACK packet belongs. Cluster cHash compute module 30 determines the director of the flow in ASA cluster N by computing a cHash based on the flow's 5-tuple {destination address, source address, protocol, destination port, source port} as input keys to the hash algorithm. Note that cHash is merely an example hash algorithm used to find the director; any suitable hash algorithm may be used within the broad scope of the embodiments.

Director query module 32 may query the director in ASA cluster N determined from the cHash computation. The director may be another ASA unit 16, say ASA C, in ASA cluster N. ASA C may receive the query, lookup its backup flows, and respond negatively to ASA B, indicating that no ASA unit 16 in ASA cluster N is the flow owner. If the flow matches inter-DC live traffic (e.g., VMs servicing the flow were live migrated from DC serviced by ASA cluster N to another DC serviced by ASA cluster M; traffic was asymmetrically received due to external routing; etc.), database query module 34 in ASA B may query an external database 48 to identify a target ASA cluster to which the flow owner belongs. In some embodiments, database 48 may have information about the target cluster, in which case, it returns the ASA cluster ID; in other embodiments, database 48 may not have information about the target cluster, in which case it responds negatively.

If target cluster is not found in database 48, cluster domain cHash compute module 36 may find the target cluster by computing a cHash of all clusters in cluster domain 18. Assume that the cHash indicates ASA cluster M to be the target cluster. Cluster cHash compute module 30 uses information from remote cluster membership list 38 to identify the director of the flow, for example, by computing the cHash over all members of the target cluster. Assume that the cHash computation identifies ASA unit 16, say, ASA D, as the domain director for the flow in target ASA cluster M.

ASA D may include a domain director module 50, which includes a processor 52 and a memory element 54. Domain director module 50 may maintain flow states 56 for the flows for which it is the director that can be used as backup in case the respective flow owners fail. ASA B queries ASA D for the flow owner to which the SYN/ACK packet belongs. ASA D looks up its flow states 56, and returns the flow owner. ASA B forwards the SYN/ACK packet to flow owner ASA A, which forwards it to client 20.

Note that because any ASA unit 16 in any ASA cluster 14 can perform functions of the flow owner, forwarder, director, or domain director (though not all simultaneously for a single flow), each ASA unit 16 may be provided with owner/forwarder module 24 and domain director module 50, in addition to other modules within the broad scope of the embodiments. Thus, when ASA A performs functions of the flow owner, it uses certain functionalities of owner/forwarder module 24; likewise when ASA A performs functions of the domain director, it uses certain functionalities of domain director module 50; and so on.

Figure 3:
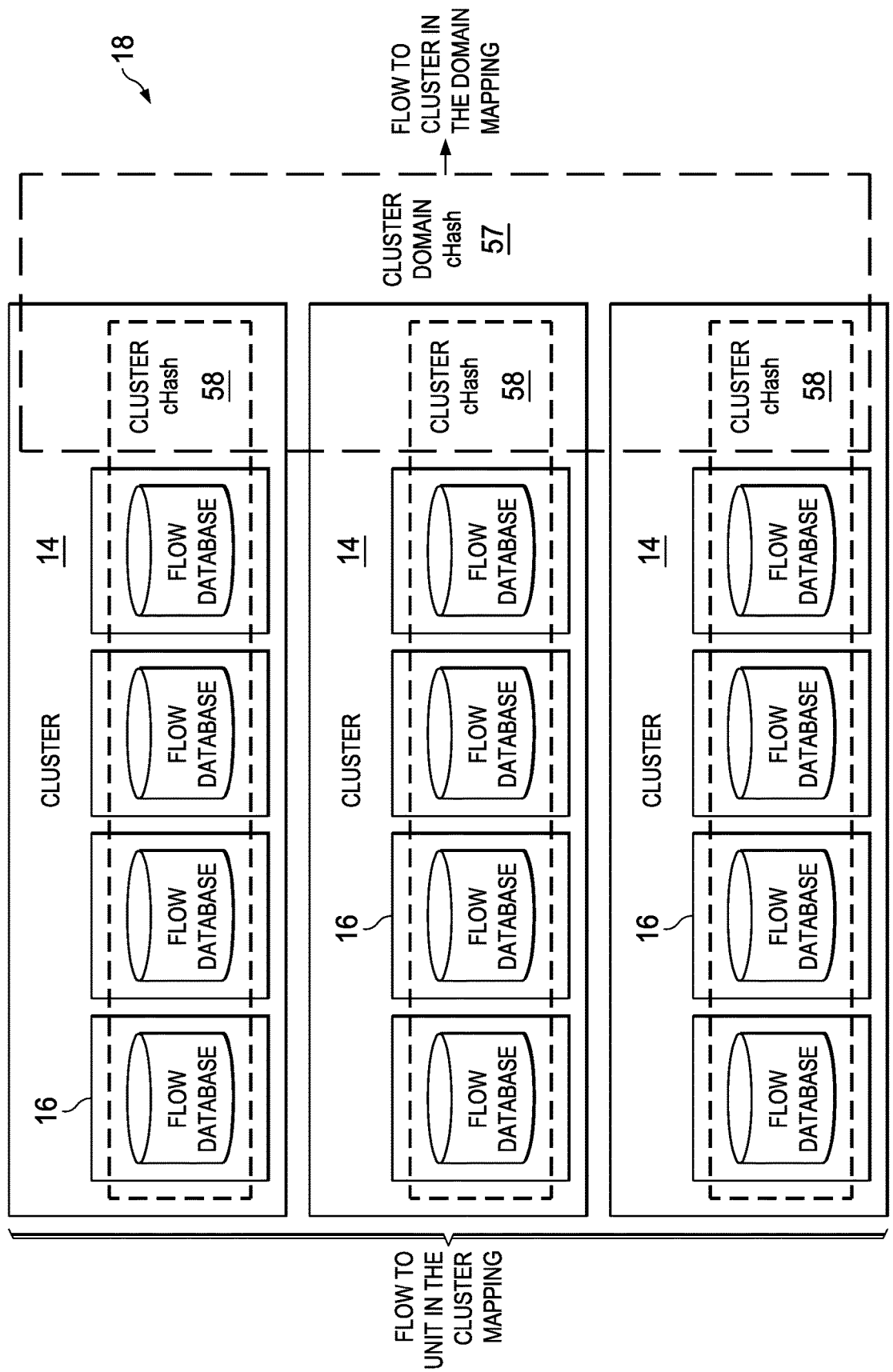
FIG. 3 is a simplified block diagram illustrating other example details of embodiments of the communication system.

Turning to FIG. 3, FIG. 3 is a simplified block diagram illustrating example hierarchical clustering hashing according to some embodiments of communication system 10. Assume that a plurality of ASA units 16 are grouped into multiple ASA clusters 14 forming cluster domain 18. According to various embodiments, each ASA unit 16 may include a flow database. In an example embodiment, flow lookup and flow redundancy uses two tier flow mapping. The domain director for a flow is identified by finding the cluster using a cluster domain cHash 57, and then finding the unit in the cluster by using a cluster cHash 58. Cluster domain cHash 57 ties a flow to the cluster in the domain mapping; whereas cluster cHash 58 ties a flow to unit in the cluster mapping. In some embodiments, cluster level cHash 58 over members in corresponding ASA cluster 14 can be used to find the director in the cluster; whereas cluster domain level cHash 57 over cluster members in the cluster domain can be used to find the domain director for the flow.

Figure 4:
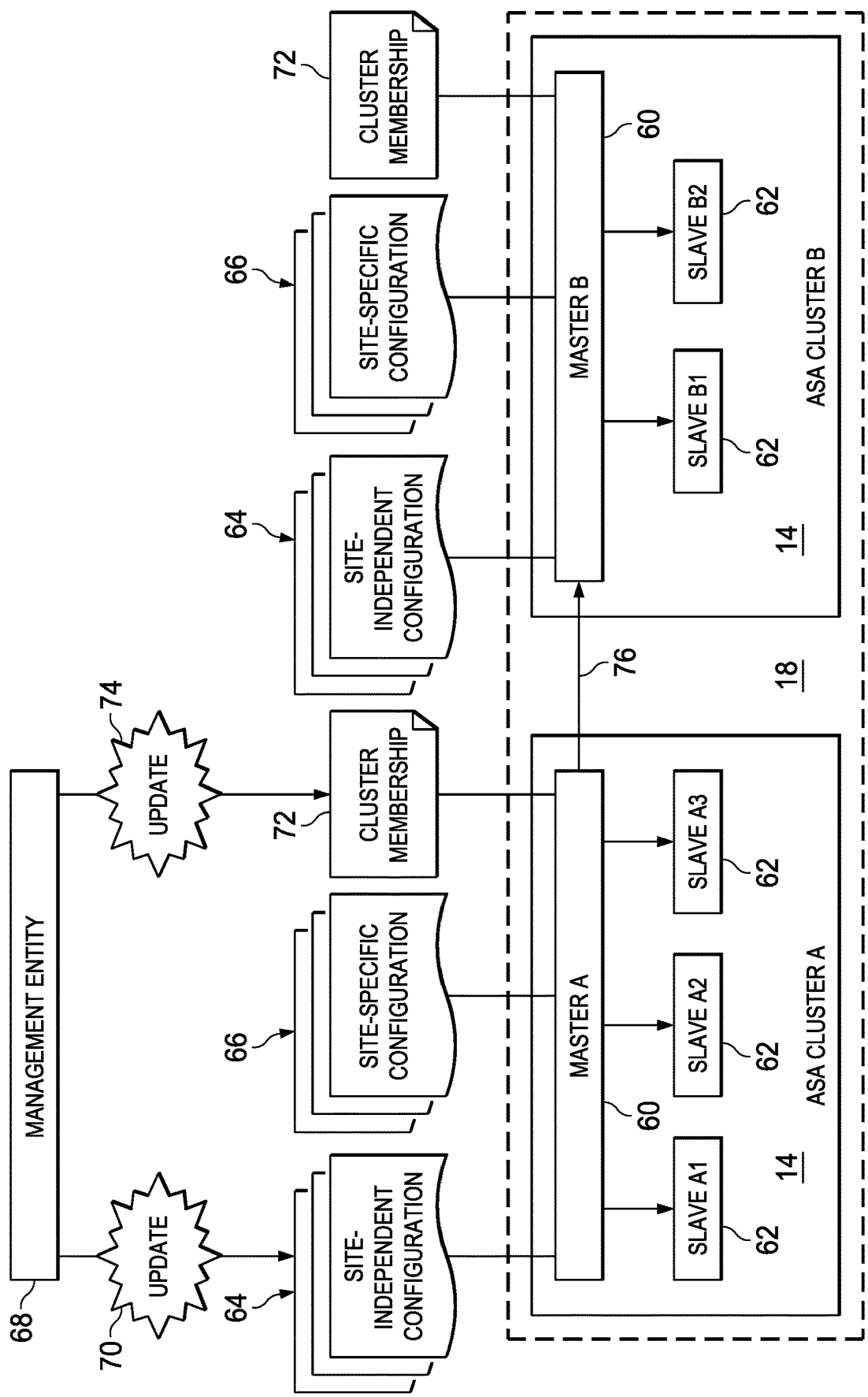
FIG. 4 is a simplified block diagram illustrating yet other example details of embodiments of the communication system.

Turning to FIG. 4, FIG. 4 is a simplified block diagram illustrating example details of an embodiment of communication system 10. Assume merely for example purposes that cluster domain 18 includes two ASA clusters 14, namely ASA cluster A and ASA cluster B. Note that any number of ASA clusters 14 may be included in cluster domain 18 within the broad scope of the embodiments.

Each ASA cluster 14 includes a cluster master 60. For example, ASA cluster A includes cluster master A; ASA cluster B includes cluster master B. Other ASA units 16 in ASA clusters 14 include slaves 62. For example, ASA cluster A includes slaves A1, A2 and A3; ASA cluster B includes slaves B1 and B2. In some embodiments, cluster master 60 obtains site-independent configuration 64 and site-specific configuration 66 from an external management entity 68. Site-independent configuration 64 includes the cluster masters' IP/MAC addresses global cluster domain security policies, inter-DC live traffic profile (e.g. zones, contexts, subnets, applications; etc.) Site-specific configuration 66 includes local resources and DC or cluster specific security policies. In some embodiments, health monitoring between each cluster master 60 and external management entity 68 can ensure that configuration in corresponding ASA cluster 14 is up-to-date. For example, ASA cluster A would be considered an active (e.g., healthy) member in cluster domain 18 if cluster master A can communicate with external management entity 68. Cluster master 60 in each ASA cluster 14 distributes the configuration to slaves 62 within the cluster. In an example embodiment, an update 70 by management entity 68 to site-independent configuration 64 at cluster master A in ASA cluster A can trigger update of slaves 72 in ASA cluster A.

According to various embodiments, peering may be established between ASA clusters 14 in cluster domain 18. In one example embodiment, TCP connections are established between cluster masters 60 in a full mesh. Any configuration updates to any one cluster master 60 triggers a synchronization with other cluster masters 60. For example, update 70 by management entity 68 to site-independent configuration 64 at cluster master A can trigger an update synchronization between cluster master A and cluster master B in cluster domain 18. Further, such synchronization at cluster masters 60 can trigger configuration push-down to respective slaves 62 in corresponding ASA clusters 14. Also, in an example embodiment, if a switchover occurs and a new cluster master is assigned in any ASA cluster 14, the new cluster master re-establishes TCP connections with the other cluster masters 60. Note that any updates to site specific configuration 66 triggers a push-down to slaves 62 within the cluster, and does not trigger any push-down to cluster masters 60 in other clusters 14 in cluster domain 18.

In various embodiments, cluster masters 60 exchange their views of the cluster membership in cluster domain 18. Each cluster master 60 maintains a cluster membership information 72, which can include membership within its own cluster and remote membership within other clusters. Cluster masters 60 exchange information about their cluster members and membership change events (e.g. member join/leave, member IP/MAC address changed; etc.). In some example embodiments, cluster membership information 72 can include remote membership list 38, which may be pushed down by cluster master 60 to the respective slaves 62 within its own ASA cluster 14. In an example embodiment, cluster membership information 72 can include membership lists indicating IP/MAC address (e.g., for CCL) of each member in its own cluster and members in other clusters. Any update to cluster membership information 72 at any one ASA cluster 14 may be propagated to cluster masters 60 in other ASA clusters 14 as appropriate For example, an update 74 (e.g., IP address update of slave A1) to cluster membership 72 at ASA cluster A triggers an automatic update of cluster membership 72 at cluster master B. Thus, cluster domain operation can be enabled when a consistent view of substantially all the clusters in cluster domain 18 is established by cluster masters 60. In some embodiments, such membership update operations may be used to handle any cluster join or leave event. In some embodiments, health monitoring of ASA clusters 14 is based on keepalive messages between cluster masters 60.

In an example embodiment, an inter-cluster CCL 76 is used for inter-cluster functions in cluster domain 18. Cluster masters 60 exchange information, including cluster membership information 72, site-independent configuration 64, and keepalive messages over CCL 76. Health monitoring of clusters 14 in cluster domain 18 may be facilitated by CCL 76. In some embodiments, flow owner lookup via domain director/backup, flow state sync via domain director/backup, and traffic redirection for inter-DC traffic may be effected over CCL 76. For inter-cluster CCL 76, metadata in any redirected packets include a map (e.g., association, correspondence, etc.) between an ingress interface (e.g., which can be different between clusters) and a policy that is common across clusters (e.g. ingress zone that is common in cluster domain 18). In some embodiments, inter-cluster CCL 76 uses jumbo frames, for example, to avoid fragmentation. In some embodiments, inter-cluster CCL 76 is restricted to traffic for the purpose of inter-cluster messaging and flow redirection; normal "user traffic" does not use inter-cluster CCL. Broadcast packets are filtered from inter-cluster communication (e.g., OTV filter) over CCL 76.

In some embodiments, management entity 68 treats cluster domain 18 as a collection of individual clusters 14. For example, with Authentication, Authorization, and Accounting (AAA) configuration, substantially all ASA clusters 14 in cluster domain 18 may communicate with the same AAA servers in some embodiments, whereas each ASA cluster 14 may communicate with its own dedicated AAA servers in other embodiments. External management entity 68 provides the AAA configuration as part of site-independent configuration 64 or site-specific configuration 66 for the former or latter case, respectively. Such configuration mechanism can apply to external services that ASA cluster 14 contact.

Management entity 68 can provide cluster management and monitoring. For example, in some embodiments, management entity 68 provides site-independent configuration 64 and site-specific configuration 66 to cluster masters 60 in ASA clusters 14. Management and monitoring of each ASA cluster 14 is performed through respective cluster master 60. Each ASA unit 16 generates management traffic such as SNMP and syslogs, which may be sent to management entity 68 for further analysis. Note that in various embodiments, management entity 68 may perform configuration sanity checks for cluster domain 18 to make sure each ASA cluster 14 has the same or at least compatible security policies.

Figure 5:
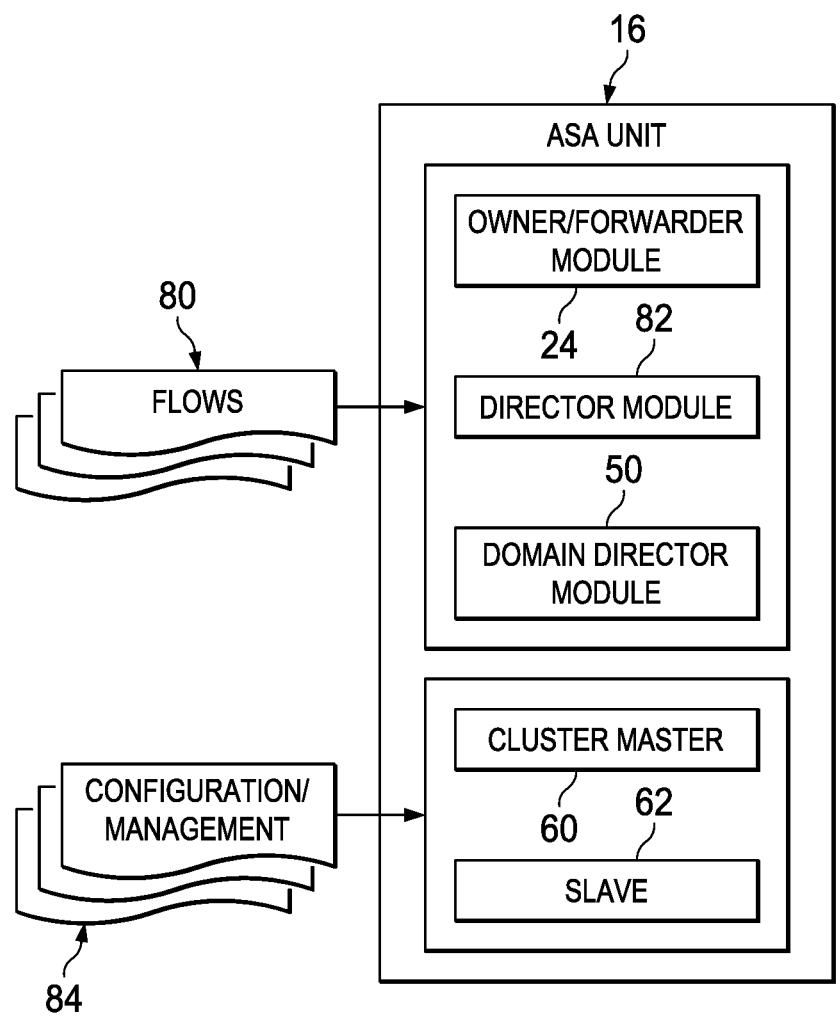
FIG. 5 is a simplified block diagram illustrating yet other example details of embodiments of the communication system.

Turning to FIG. 5, FIG. 5 is a simplified block diagram illustrating example details of ASA unit 16 according an embodiment of communication system 10. Example ASA unit 16 may include various modules that perform different functions. For example, flows 80 may be operated on by one of owner/forwarder module 24, a director module 82, or a domain director module 50. Owner/forwarder module 24 receives packets of a flow and forwards it according to flow tables based on whether it is the flow owner, or a forwarder (i.e., not the flow owner).

Director module 82 can function as a director for certain flows within a single cluster 14. Director module 82 may maintain backup of flows within its cluster 14, and can provide flow owner information to queries for flows within the cluster for which it is the director. Domain director module 50 performs functions of a director at a cluster domain level. Thus, domain director module 50 may maintain backup of flows within its cluster domain 18, and can provide flow owner information to queries for flows within the cluster domain for which it is the domain director. Note that the flow modules comprising owner/forwarder module 24, director module 82, and domain director module 50 may be active simultaneously for different flows being serviced by the specific ASA unit 16. Further, other flow modules, such as back up modules may also be provisioned in ASA unit 16, although not explicitly illustrated in the figure.

In various embodiments, configuration/management 84 information may be handled by separate cluster master 60 or slave 62. Unlike the flow modules, the configuration module can comprise either cluster master 60 or slave 62, but not both. Any configuration/management 84 information is handled by cluster master 60, or slave 62, as the case may be. For example, if example ASA unit 16 is the cluster master in a specific cluster, cluster master 60 module may be active and slave 62 module may be inactive; if example ASA unit 16 is not the cluster master in the specific cluster, slave 62 module may be active and cluster master 60 module may be inactive.

Figure 6:
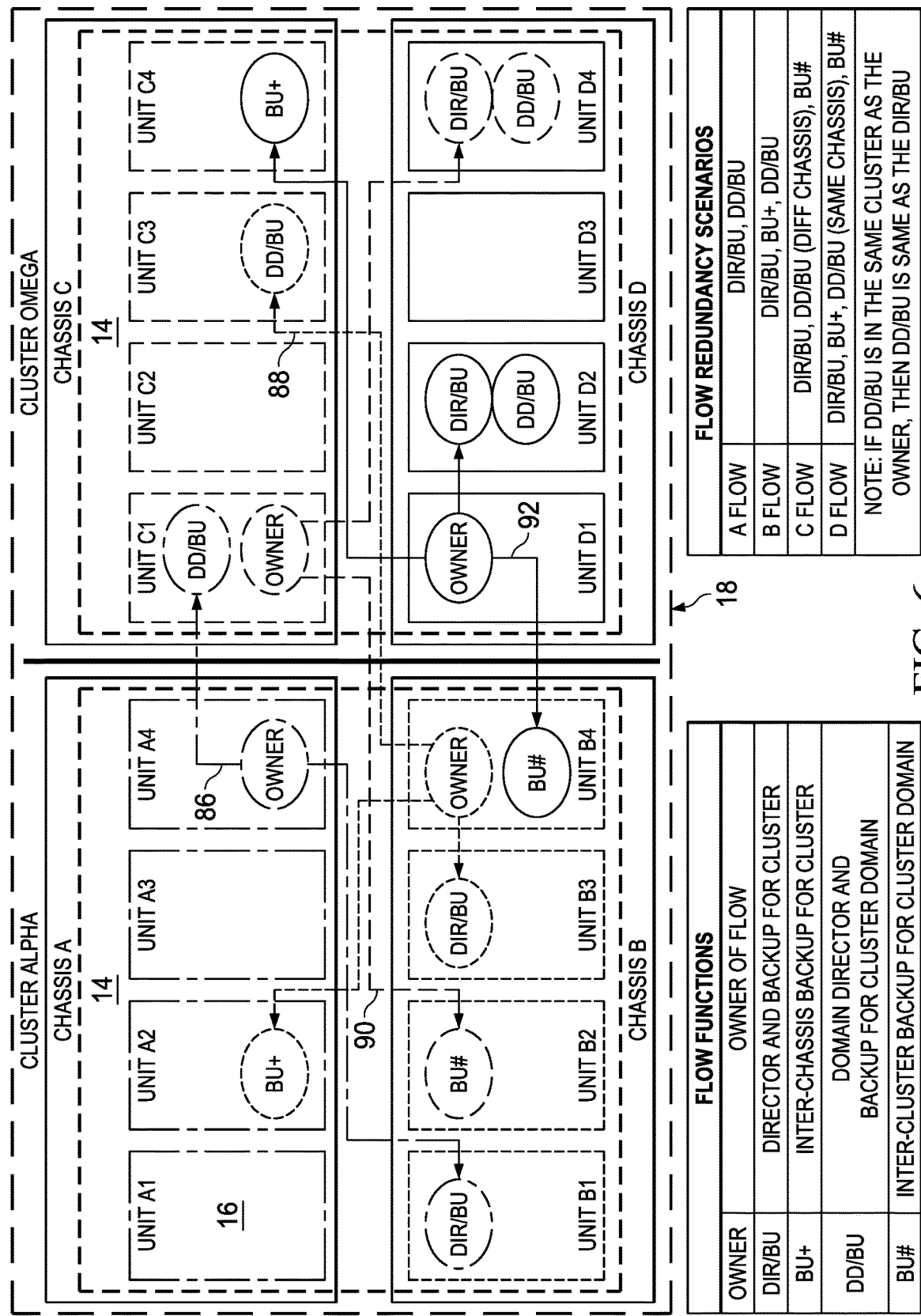
FIG. 6 is a simplified block diagram illustrating yet other example details of embodiments of the communication system.

Turning to FIG. 6, FIG. 6 is a simplified block diagram illustrating example details according to an embodiment of communication system 10. Cluster domain 18 includes example ASA clusters 14, namely cluster Alpha and cluster Omega. Each ASA cluster 14 includes a plurality of ASA units 16, some of which may be installed on a common chassis (e.g., physical supporting structure that can house the ASA units, appliances, blades, modules, etc.) For example, cluster Alpha includes some ASA units 16, namely Unit A1, Unit A2, Unit A3 and Unit A4 housed in Chassis A; and other ASA units 16, namely Unit B1, Unit B2, Unit B3 and Unit B4 housed in Chassis B. Similarly, cluster Omega includes some ASA units 16, namely Unit C1, Unit C2, Unit C3 and Unit C4 housed in Chassis C; and other ASA units 16, namely Unit D1, Unit D2, Unit D3 and Unit D4 housed in Chassis D.

Merely for example purposes, assume four flows 86, 88, 90 and 92 in cluster domain 18. Flow 86 represents A Flow, with flow owner at Unit A4, director and backup (DIR/BU) for cluster Alpha at Unit B1, and Domain Director and backup for cluster domain (DD/BU) at Unit C1. Flow 88 represents B Flow, with flow owner at Unit B4, DIR/BU for cluster Alpha at Unit B3, and DD/BU at Unit C3 and inter-chassis backup (BU+) for cluster Alpha at Unit A2. Note that BU+ can provide backup flows when an entire chassis (e.g., chassis B) in the cluster fails. Flow 90 represents C Flow, with flow owner at Unit C1, DIR/BU for cluster Omega at Unit D4, inter-cluster backup for cluster domain (BU #) at Unit B2, and DD/BU at Unit D4. When the DD/BU is in the same cluster (e.g., cluster Omega) as the flow owner, the DD/BU is the same as the DIR/BU. Thus, DD/BU and DIR/BU for flow 90 is at Unit D4. Flow 92 represents D Flow, with flow owner at Unit D1, DIR/BU for cluster Omega at Unit D2, and DD/BU at Unit D2, and BU # for cluster domain 18 at Unit B4. Note that BU # can provide backup flows when an entire cluster (e.g., cluster Omega) in cluster domain 18 fails.

According to various embodiments, if any specific DD/BU fails, flows may be backed up to another unit in the same cluster. For example, if DD/BU at Unit C1 for flow 86 fails, the flows can be backed up to a replacement DD/BU in Unit C3 in the same cluster as the original DD/BU. If the DIR/BU-DD/BU combination fails in the same cluster as the flow owner, a replacement DIR/BU-DD/BU may be provisioned in another unit in the same cluster. For example, if DIR/BU-DD/BU at Unit D4 for flow 92 fails, the flows can be backed up to a replacement DIR/BU-DD/BU in Unit D3 within the same cluster. Likewise, if BU # in Unit B4 fails for flow 92, flows may be backed up to a replacement BU # in the same cluster as the original BU #.

In various embodiments, flow redundancy logic for a single ASA cluster 14 is enhanced to support cluster domain 18. In addition to the intra-cluster flow redundancy, cluster domain 18 provides N:1 cluster redundancy in a distributed manner for inter-DC live traffic flows in cluster domain 18. In an example embodiment, cluster domain flow redundancy control configuration includes setting the inter-DC live traffic profile (e.g., through management entity 68). The configuration may also include initial flow state sync delay, periodic flow state sync interval (e.g., for refresh), flow state expiration (e.g., based on missed syncs), with other optimizations, such as flow state keepalives for owner directory service without flow redundancy, using reliable sync, and batching several sync updates together. In some embodiments, 5-tuples may be synchronized and periodic keepalives, recover/learn state after failure may be communicated among ASA clusters 14.

According to various embodiments, when new ASA unit 16 is added to cluster 14 (e.g., cluster Alpha), ASA clustering performs flow bulk sync for the DIR/BU in the cluster (e.g., which converges the cHash formula for ASA unit 16 members in cluster 14). Some of the DIR/BU states for flows owned by cluster 14 (e.g., cluster Alpha) are moved to the new ASA unit 16. In addition, a flow bulk sync is performed at the cluster domain level for the DD/BU (e.g., which converges the cHash formula for ASA clusters 14 in cluster domain 18). Some of the DD/BU states for flows owned by other ASA clusters 14 are moved to the new ASA unit 16. When a new ASA cluster 14 is added to cluster domain 18, flow bulk sync is performed at the cluster domain level for the DD/BU (e.g., which converges the cHash formula for ASA clusters 14 in cluster domain 18). Some of the DD/BU states for flows owned by other ASA clusters 14 are moved to the new ASA cluster 14. In addition, substantially all the flows owned by the new ASA cluster 14 are spread among other ASA clusters 14 in DD/BU states.

The cluster domain bulk sync control configuration prevents overload during bulk sync operation with optimizations in some embodiments including reliable sync operations and batch sync updates. Note that inter-cluster flow bulk sync can cause extra network bandwidth and processing. However, in various embodiments, the cluster domain flow redundancy may be limited to inter-DC live traffic, which can reduce the extra bandwidth and processing overheads.

Figure 7:
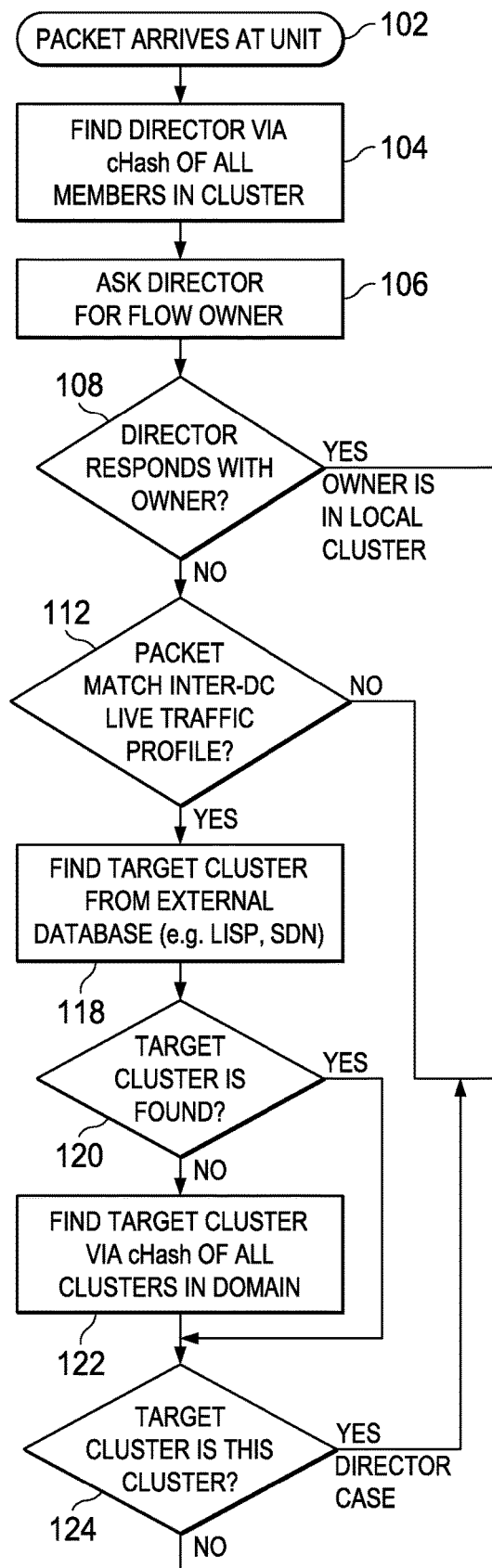
FIG. 7 is a simplified diagram illustrating example operations that may be associated with an embodiment of the communication system.
Figure 7:
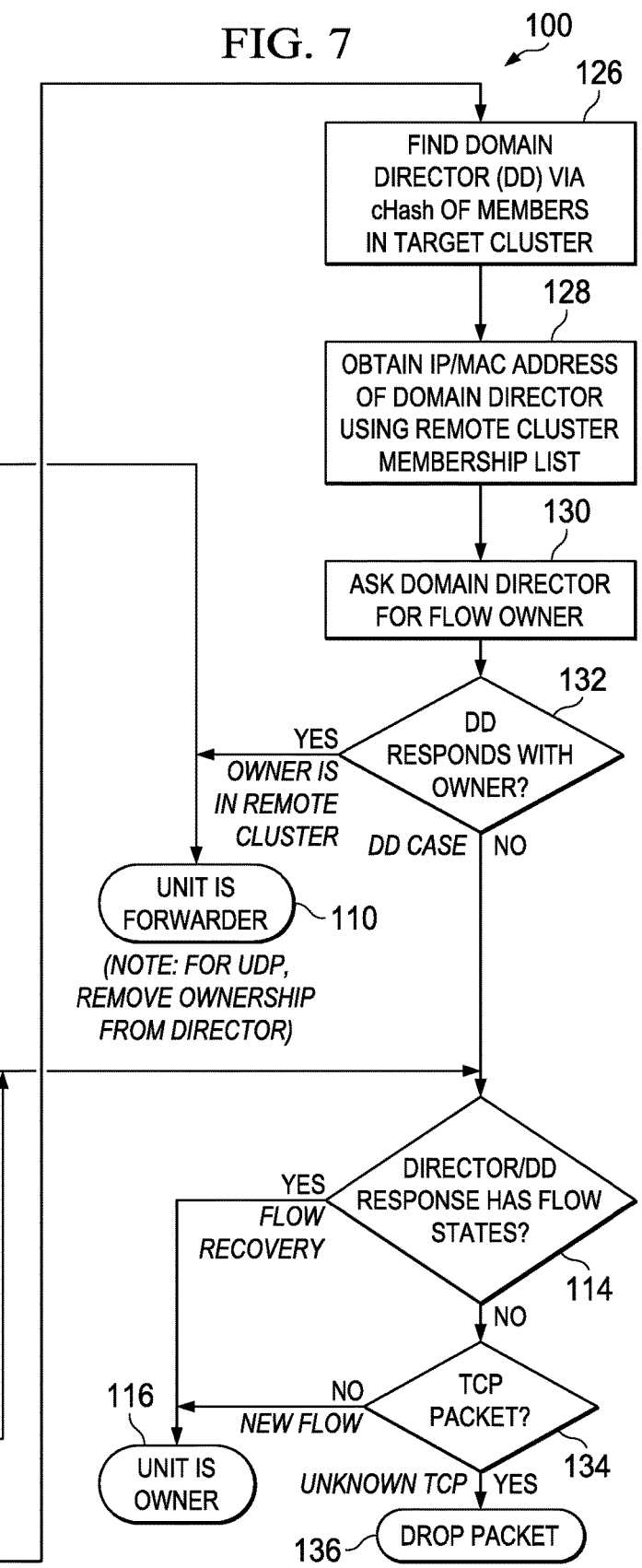

Turning to FIG. 7, FIG. 7 is a simplified flow diagram illustrating example operations 100 that may be associated with an embodiment of communication system 10. At 102, a packet arrives at one of ASA unit 16s in one of ASA clusters 14 in cluster domain 18. At 104, ASA unit 16 finds the director via a cHash computation of all ASA unit 16 members in ASA cluster 14, to which ASA unit 16 belongs. At 106, ASA unit 16 queries (e.g., asks, requests, etc.) the identified director for the flow owner. At 108, a determination may be made by ASA unit 16 whether the director has responded with the flow owner. If the director responds with the flow owner identity, at 110, ASA unit 16 identifies itself as a forwarder and forwards the packet to the identified flow owner in the local cluster.

On the other hand, at 108, if the director does not respond with the flow owner identity, or responds negatively with the flow owner identity (e.g., do-not-know type of response, NULL response, etc.), at 112, a determination may be made at ASA unit 16 if the packet matches inter-DC live traffic profile. If the packet does not match inter-DC live traffic profile, at 114, a determination is made whether the director in ASA cluster 14 to which ASA unit 16 belongs has the flow states for the flow to which the packet belongs. If it does, but the flow owner is not identified (e.g., at 108), the situation is one of flow recovery, and ASA unit 16 identifies itself as the flow owner at 116.

Turning back to 112, if the packet matches the inter-DC live traffic profile, at 118, ASA unit 16 may query external database 48 for the target cluster, to which the flow owner belongs. At 120, a determination may be made at ASA unit 16 whether the target cluster has been identified. If not (e.g., database query returns a null answer), at 122, ASA unit 16 finds the target cluster via a cHash of ASA clusters 14 in cluster domain 18. After the target cluster is found (e.g., from external database 48 at 120 or cHash computation at 122), at 124, a determination may be made whether the cluster of ASA unit 16 is the target cluster. If it is the target cluster, the operations may step to 114, at which a determination is made whether the director in ASA cluster 14 to which ASA unit 16 belongs has the flow states for the packet's flow.

On the other hand, if it is not the target cluster, at 126, ASA unit 16 may find the domain director via a cHash of ASA unit 16 members in the target cluster, for example, using its local copy of remote cluster membership list 38. At 128, ASA unit 16 may obtain the IP address and MAC address of the identified domain director using remote cluster membership list 38. At 130, ASA unit 16 may ask the identified domain director for the flow owner. At 132, a determination may be made whether the domain director responds with the flow owner. If the domain director responds with the flow owner, the operations revert to 110, at which ASA unit 16 identifies itself as a forwarder and forwards the packet to the identified flow owner.

If the domain director does not respond with the flow owner, the operations may step to 114, at which a determination may be made whether the domain director has the flow states corresponding to the packet. If it has the flow state, but the flow owner cannot be identified, the situation would be one of flow recovery in cluster domain 18, and ASA unit 16 may identify itself as the new flow owner at 132. If the domain director does not have the flow state, at 134, a determination may be made whether the packet is a TCP packet. If not, the flow is identified as a new flow, and the operations revert to 116, at which ASA unit 16 identifies itself as the flow owner. If the packet is a TCP packet, but the flow owner cannot be identified (e.g., at 108), and neither the director nor the domain director has the flow states (e.g., at 114), at 136, the packet may be dropped.

Figure 8:
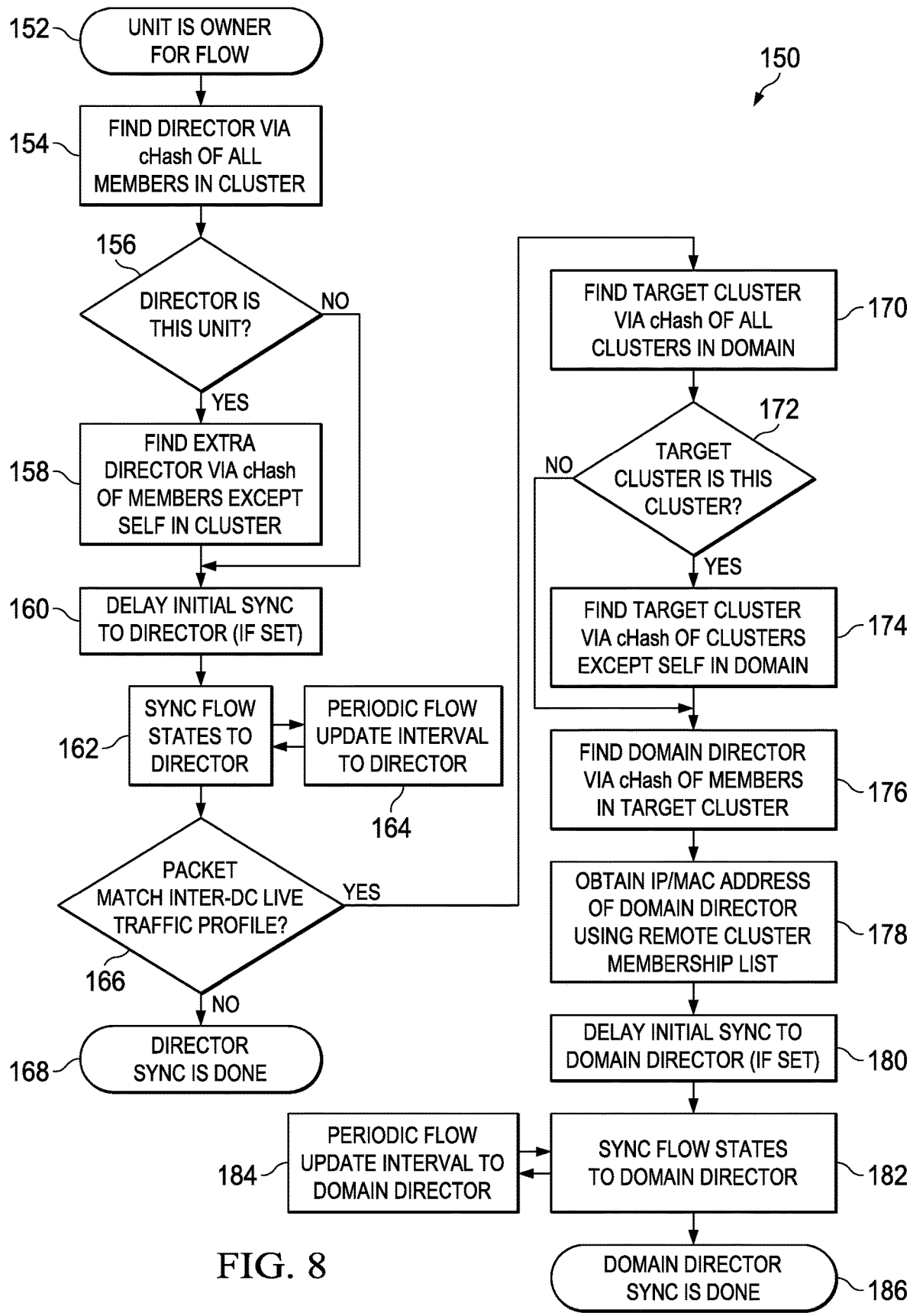
FIG. 8 is a simplified diagram illustrating other example operations that may be associated with an embodiment of the communication system.

Turning to FIG. 8, FIG. 8 is a simplified flow diagram illustrating example operations 150 that may be associated with embodiments of communication system 10. At 152, ASA unit 16 identifies itself as the flow owner. At 154, ASA unit 16 finds the director via cHash of members in its ASA cluster 14. At 156, a determination may be made whether the director is ASA unit 16 itself. If so, ASA unit 16 performs another cHash over all members except itself in its ASA cluster 14. Either way (e.g., whether it is not the director as determined at 156, or whether an alternate director is found at 158), at 160, the initial sync to the identified director may be delayed. At 162, flow states are synced to the identified director. At 164, periodic flow update intervals to the director are made. At 166, a determination may be made if a received packet matches the inter-DC traffic profile. If not, at 168, the sync operation with the director is deemed complete.

On the other hand, if the received packets matches the inter-DC traffic profile, at 170, ASA unit 16 finds the target cluster via cHash of all ASA clusters 14 in cluster domain 18. After the target cluster is found, at 172, a determination may be made whether the cluster of ASA unit 16 is the target cluster. If it is the target cluster, another target cluster may be identified via a cHash of all cluster members except its own ASA cluster 14. Either way (e.g., if it is not the target cluster, or if an alternate target cluster has been identified), at 176, ASA unit 16 may find the domain director via a cHash of ASA unit 16 members in the target cluster, for example, using its local copy of remote cluster membership list 38. At 178, ASA unit 16 may obtain the IP address and MAC address of the identified domain director using remote cluster membership list 38.

At 180, the initial sync to the identified domain director may be delayed. At 182, flow states at ASA unit 16 are synced to the identified domain director. At 184, periodic flow update intervals to the domain director are made. At 186, the sync operation with the domain director is deemed complete.

Turning to FIG. 9, FIG. 9 is a simplified diagram illustrating example details according to an embodiment of communication system 10. Table 190 illustrates example ASA unit states in cluster domain 18. If the packet received at ASA unit 16 is a TCP SYN packet, and the flow is a new flow in cluster domain 18, ASA unit 16 becomes the flow owner as indicated in box 192. Note that if a TCP SYN packet for a new flow is received by an ASA unit, then it becomes the flow owner and therefore the flow owner is immediately known. If the packet received at ASA unit 16 is a TCP SYN/ACK packet, and the flow is a new flow in cluster domain 18, the flow owner information including the cluster ID and unit ID is known from the SYN cookie as indicated in box 194, and the packet can be forwarded appropriately.

If the packet received at ASA unit 16 is not a connection-initiating packet (e.g., the packet is a TCP SYN/ACK packet without a cookie, or a UDP packet, or a TCP payload packet, or any other packet that clearly does not indicate a new connection attempt), and the flow is a new flow in cluster domain 18, a lookup of the flow owner in either ASA unit 16's cluster or cluster domain 18 will return nothing, as indicated by box 196. On the other hand, if the flow is an existing one for cluster domain 18, but a new flow in local ASA cluster 14 to which ASA unit 16 belongs (e.g., as can happen with live VM migrations and ASA cluster outage), a lookup of flow owner in ASA cluster 14 brings up nothing (e.g., because new flow), whereas a lookup of the flow owner in cluster domain 18 indicates the flow owner, as indicated by box 198. Further, if the flow is an existing one for cluster domain 18 and local ASA cluster 14, a lookup of local ASA cluster 14 brings up the flow owner, as indicated by box 200.

In an example embodiment, the flows are mostly TCP flows within a single cluster. In the mostly rare event of a live migration or outage, flows may migrate across clusters. Thus, extra lookups and processing can be avoided if cluster lookup is performed first, followed by cluster domain lookup.

Note that in this specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, ASA unit 16. In some embodiments, one or more of these features may be implemented in hardware, provided external to these elements, or consolidated in any appropriate manner to achieve the intended functionality. The various network elements (e.g., ASA units 16) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, ASA units 16 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 28, 54) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processors 26, 52) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable hardware processor, integrated circuit, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving a packet at one of a plurality of adaptive security appliance (ASA) units in one of a plurality of ASA clusters in a cluster domain of a network environment;
   identifying the packet, by the one of the plurality of ASA units, as matching an inter-data center live traffic profile;
   identifying, by the one of the plurality of ASA units, a target ASA cluster in the plurality of ASA clusters in the cluster domain;
   identifying a domain director in the target ASA cluster via a hash algorithm;
   querying, by the one of the plurality of ASA units, the domain director in the target ASA cluster for an identification of a flow owner;
   when the identification of the flow owner is received, forwarding the packet to the flow owner in the target ASA cluster;
   when the identification of the flow owner is not received and the domain director includes a flow state or the packet is determined to be a connection-initiating packet, designating the one of the plurality of ASA units as the flow owner; and
   when the identification of the flow owner is not received, the domain director does not include the flow state, and the packet is determined to not be the connection-initiating packet, dropping the packet.

2. The method of claim 1, wherein the packet is determined to not be the connection-initiating packet when the packet is a TCP packet.

3. The method of claim 1, wherein the packet is determined to not be the connection-initiating packet when the packet does not include a cookie or is a UDP packet.

4. The method of claim 1, wherein the identifying of the target ASA cluster includes querying a database.

5. The method of claim 1, wherein the identifying of the target ASA cluster includes computing a consistent hash (cHash) of all of the plurality of ASA clusters in the cluster domain.

6. The method of claim 1, wherein the hash algorithm used to identify the domain director in the target ASA cluster is a consistent hash (cHash) of all of the plurality of ASA units in the target ASA cluster.

7. The method of claim 6, further comprising:
   obtaining an Internet Protocol/Media Access Control (IP/MAC) address of the domain director from a local copy of a remote cluster membership list at the ASA unit.

8. The method of claim 1, wherein each of the plurality of ASA clusters includes a plurality of ASA units.

9. The method of claim 1,
   wherein,
   site-independent configuration of the ASA units in the cluster domain is the same among all the plurality of ASA units in all the plurality of ASA clusters in the cluster domain, and
   site-specific configuration of the plurality of ASA units in each of the plurality of ASA clusters is different from corresponding configurations of the plurality of ASA units in other ones of the plurality of ASA clusters in the cluster domain.

10. The method of claim 9,
wherein,
the one of the plurality of ASA units is a cluster master, and
updates to the site-independent configuration of the one of the plurality of ASA units trigger an update, by the one of the plurality of ASA units, to other cluster masters in the other ones of the plurality of ASA clusters in the cluster domain.

11. Non-transitory tangible media encoding logic with instructions for execution that, when executed by a processor of an adaptive security appliance (ASA) unit, is operable to perform operations comprising:
receiving a packet at the ASA unit, the ASA unit being one of a plurality of ASA units in one of a plurality of ASA clusters in a cluster domain of a network environment;
identifying the packet as matching an inter-DC live traffic profile;
identifying a target ASA cluster in the plurality of ASA clusters in the cluster domain;
identifying a domain director in the target ASA cluster via a hash algorithm;
querying the domain director in the target ASA cluster for an identification of a flow owner;
when the identification of the flow owner is received, forwarding the packet to the flow owner in the target ASA cluster;
when the identification of the flow owner is not received and the domain director includes a flow state or the packet is determined to be a connection-initiating packet, designating the ASA unit as the flow owner; and
when the identification of the flow owner is not received, the domain director does not include the flow state, and the packet is determined to not be the connection-initiating packet, dropping the packet.

12. The media of claim 11, wherein the packet is determined to not be the connection-initiating packet when the packet is a TCP packet.

13. The media of claim 11, wherein the packet is determined to not be the connection-initiating packet when the packet does not include a cookie or is a UDP packet.

14. The media of claim 11, wherein the identifying of the target ASA cluster includes computing a consistent hash (cHash) of all of the plurality of ASA clusters in the cluster domain.

15. The media of claim 11, wherein the hash algorithm used to identify the domain director in the target ASA cluster is a consistent hash (cHash) of all ASA units in the target ASA cluster.

16. An apparatus comprising:
a memory element for storing data; and
a processor configured to execute instructions associated with the data, the processor and the memory element cooperate, such that the apparatus is configured as an adaptive security appliance (ASA) unit to:
receive a packet at the ASA unit, the ASA unit including one of a plurality of ASA units in one of a plurality of ASA clusters in a cluster domain of a network environment;
identify the packet as matching an inter-DC live traffic profile;
identify a target ASA cluster in the plurality of ASA clusters in the cluster domain;
identify a domain director in the target ASA cluster via a hash algorithm;
query the domain director in the target ASA cluster for an identification of a flow owner;
when the identification of the flow owner is received, forward the packet to the flow owner in the target ASA cluster;
when the identification of the flow owner is not received and the domain director includes a flow state or the packet is determined to be a connection-initiating packet, designate the ASA unit as the flow owner; and
when the identification of the flow owner is not received, the domain director does not include the flow state, and the packet is determined to not be the connection-initiating packet, drop the packet.

17. The apparatus of claim 16, wherein the packet is determined to not be the connection-initiating packet when the packet is a TCP packet.

18. The apparatus of claim 16, wherein the packet is determined to not be the connection-initiating packet when the packet does not include a cookie or is a UDP packet.

19. The apparatus of claim 16, wherein identifying the target ASA cluster comprises computing a consistent hash (cHash) of all of the plurality of ASA clusters in the cluster domain.

20. The apparatus of claim 16, wherein the hash algorithm used to identify the domain director in the target ASA cluster is a consistent hash (cHash) of all ASA units in the target ASA cluster.

* * * * *